United States Patent [19]

Metz

[11] 4,328,115

[45] May 4, 1982

[54] CHEMICAL ACIDOGEN SYSTEM FOR FOODSTUFFS

[75] Inventor: Fred L. Metz, Concord, Ohio

[73] Assignee: Mallinckrodt, Inc., St. Louis, Mo.

[21] Appl. No.: 153,315

[22] Filed: May 27, 1980

Related U.S. Application Data

[60] Division of Ser. No. 63,244, Aug. 3, 1979, Pat. No. 4,264,636, which is a continuation-in-part of Ser. No. 861,908, Dec. 19, 1977, Pat. No. 4,199,609.

[51] Int. Cl.$^3$ ............................................. C01B 15/02
[52] U.S. Cl. .............................. 252/186; 252/188.3 R; 423/272; 426/39; 426/551; 426/580; 426/582; 426/583
[58] Field of Search ........................ 252/186, 188.3 R; 423/272, 273; 426/36, 580, 582, 583, 551, 39

[56] References Cited

U.S. PATENT DOCUMENTS

| | | | |
|---|---|---|---|
| 3,864,271 | 2/1975 | Stalter | 252/186 |
| 4,022,703 | 5/1977 | Bakes et al. | 252/186 |
| 4,130,501 | 12/1978 | Lutz et al. | 252/186 |

*Primary Examiner*—Benjamin R. Padgett
*Assistant Examiner*—Irwin Gluck
*Attorney, Agent, or Firm*—Bernard, Rothwell & Brown

[57] ABSTRACT

Coagulated protein food products such as cottage cheese, bakers' cheese, cream cheese and "tofu," i.e., soybean curd, are prepared by adding an aliphatic $C_{2-6}$ dione and hydrogen peroxide to bovine milk of varying solids content or to soybean milk, the acid necessary for the acidification and protein coagulation being generated by the oxidation of the dione "in situ." This acidogen system is likewise adaptable to the leavening of various bakery doughs in combination with sodium bicarbonate.

4 Claims, No Drawings

CHEMICAL ACIDOGEN SYSTEM FOR FOODSTUFFS

CROSS-REFERENCE TO RELATED APPLICATION

This is a division of application Ser. No. 63,244, filed Aug. 3, 1979, now U.S. Pat. No. 4,264,636, which is a continuation-in-part of my copending application, Ser. No. 861,908, filed Dec. 19, 1977, now U.S. Pat. No. 4,199,609.

BACKGROUND OF THE INVENTION

It has long been the practice in the art to prepare acidified dairy products as, for example, cottage cheese, by inoculating bovine milk with mixed cultures of lactic acid-forming bacteria which ferment the milk until the desired acidity is achieved. Dairy products obtained commercially by this process are known as cultured products. The word "cultured" is used generically to describe any dairy product acidified by a process involving the use of bacteria in one of the processing steps. Preparing dairy products using bacterial cultures has oftentimes provided unsatisfactory results, however, in that the products can vary in quality and shelf life from day to day. Further, due to the long time period required for the fermentation, bacterial culture processes are not adaptable either to continuous operation or to automation techniques.

Various processes for preparing cheese from chemically acidified milk without using bacterial fermentation have more recently become known and practiced in the art. For example, U.S. Pat. Nos. 2,982,654 (Hammond et al.); 3,172,767 (Foster et al.); 3,406,076 (Little); 3,620,768 (Corbin); and 3,882,250 (Loter et al.) teach processes for making cheese curd at varying temperatures, employing various acidogens with or without further addition of proteolytic enzymes. Soybean curd, commonly known as "tofu," is an economical high protein food free of cholesterol and low in saturated fatty acids. It has long been prepared by extracting the juice (or milk) from soybeans, then coagulating the protein in the milk by addition of a coagulant. Many chemicals traditionally have been used as coagulants, for example, calcium sulfate, calcium chloride, magnesium chloride, feric chloride, sodium bisulfate, and acetic acid (vinegar) or other edible acids. The most widely used of these coagulants traditionally has been calcium sulfate.

Finally, it has long been known to prepare raised bakery products, e.g., bread, cake, biscuits and the like, both by the use of yeast or by chemicals evolving $CO_2$ as leavening agents.

SUMMARY OF THE INVENTION

This invention comprises a novel chemical acidogen for use in the production of acidified dairy products, for the production of "tofu," and as part of the chemical leavening system in the production of raised bakery products. This acidogen consists of any one of a group of selected diones and hydrogen peroxide in combination. Using this acidogen, acidified dairy products can be prepared rapidly and economically using standard equipment without employing bacterial fermentation, without the use of a coagulation aid such as a proteolytic enzyme, or other time consuming steps. Soy milk treated with the acidogen produces a coagulum of good gel strength, curd quality and whey out properties.

Under normal baking conditions, the acidogen system of this invention, in combination with sodium bicarbonate, produces bread having the fine crumb characteristics of yeast leavened dough. Those which are prepared, frozen and subsequently baked typically exhibit normal leavening, showing good freeze stability for the acidogen.

DESCRIPTION OF THE PREFERRED EMBODIMENTS

As used herein in the specification and claims, the terms "acidogen," "acidogen system" and "chemical acidogen" are each intended broadly to refer to one or more substances which, when added to protein-containing liquids, will slowly liberate an acid capable of coagulating the protein, such substance or substances being soluble in but nonreactive to said protein-containing liquids.

In one embodiment of the present invention, the acidogen system herein can be used to manufacture cottage cheese, bakers' cheese, and creamed acid-curd cheese such as cream cheese, Neufchatel cheese and the like from bovine milk, i.e., cow's milk. By "milk" is meant fresh skim milk, skim milk having about 1 to 4 percent, by weight, or more of added nonfat milk solids (NFMS), whole milk, milk-cream mixtures, half milk and half cream, reconstituted condensed milk, reconstituted milk powder and the like. Used generically in the present invention, the term "milk" is intended to include low, medium and high butterfat milk or cream having as much as 20 percent butterfat.

In another embodiment of this invention, the acidogen system is used to prepare "tofu," i.e., the protein curd coagulated from soybean milk. Besides being one of the best low cost sources of protein, soybean curd, or tofu, is an extremely healthful food being free of cholesterol and low in saturated fatty acids.

In still another embodiment of this invention, the acidogen system of this invention is used to prepare raised bakery products of fine crumb characteristics.

The acidogen system of this invention is a combination of at least one of a selective group of diones and hydrogen peroxide ($H_2O_2$). The acid necessary for the desired acidification and ensuing protein coagulation or bakery dough leavening is generated by the oxidation of the dione "in situ." Specifically, the diones used are acyclic and cyclic aliphatic compounds containing from 2 to 6 carbon atoms per molecule, and wherein the carbonyl groups are vicinal to each other. These diones conform to one of the following structures:

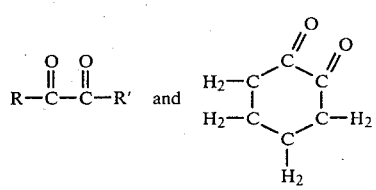

wherein R and R' are each hydrogen or $C_{1-2}$ alkyl. Acyclic diones which are useful include ethanedial, more commonly designated in the art as glyoxal; pyruvaldehyde; diacetyl; and 2,3-pentanedione. A specific cyclic dione used in this invention is 1,2-cyclohexanedione. In the preparation of cheese products and soybean curd, glyoxal is presently preferred for use, while in the preparation of the raised bakery products, pyruvaldehyde is presently the preferred component of the leavening system.

In the preparation of cheese products, the process generally may be carried out at a temperature of 4°–40° C., with temperatures of 25°–40° C. preferred, and temperatures of 28°–35° C. being most preferable. In practice, the acidogen components may be added to the cold milk and the resulting mixture heated to the selected reaction temperature. Alternatively, the milk may be heated to the desired temperature prior to adding the acidogen thereto. Incorporation of the acidogen is effected with gentle agitation of the milk, vigorous agitation generally being unnecessary.

Throughout the acidification process, the pH of the milk is progressively lowered at a controlled rate to the protein coagulation stage (usually at a pH below 5.0) by the acid generated from the concomitant oxidation of the dione component. As an example, when glyoxal is employed in combination with hydrogen peroxide as the acidogen system, the glyoxal is oxidized to formic acid. No other acidulents such as are used in the prior art need by used herein to effect the desired coagulation. However, it is to be understood that food-grade acids may be added to the milk prior to the acidogen without departing from the scope of the invention. This aspect of the invention is described more fully in my copending application, Ser. No. 861,908, the disclosure of which is incorporated herein by reference.

Depending upon the selected acidification reaction temperature, the initial temperature of the milk, the molecular weight of the particular dione component to be used and the percentage of milk solids in the milk, from about 0.05 part, by weight, to 0.50 part, by weight, of dione in combination with from about 0.10 part, by weight, to 0.50 part, by weight, of hydrogen peroxide per 100 parts, by weight, of the milk generally will provide the desired acidification rate. When conducting the acidification at a temperature of 28°–35° C. in accordance with presently preferred practice, from about 0.10 to 0.20 part, by weight, of dione and from 0.10 to 0.30 part, by weight, of hydrogen peroxide per 100 parts, by weight, of milk generally is satisfactory.

After mixing, the milk-acidogen combination is maintained at the reaction temperature with no agitation until cuttable curd is obtained, which time period will vary from about 30 minutes to 24 hours. Upon completion of the reaction, the cheese curd product is cut and cooked in a conventional manner. Thereafter, the cheese curd is processed as required to make the desired cheese product. These processing steps are described more fully in my aforesaid copending application, which disclosure is incorporated herein by reference.

To prepare soybean curd, i.e., tofu, soybean milk is first extracted from soybeans as conventionally practiced in the art. A typical extraction will be described by a specific example hereinafter. The acidogen system of this invention is added to the extracted milk to coagulate the protein, the acidogen components in aqueous solution preferably being added separately to the milk. The curd which develops is separated from the whey and is gelled (firmed) completely prior to being cut. The tofu prepared in accordance with this invention has excellent gel strength by comparison to that obtained by using conventional coagulants such as calcium chloride or calcium sulfate.

From about 0.3 part, by weight, to 0.5 part, by weight, of dione in combination with from about 0.2 to 0.3 part, by weight, of hydrogen peroxide per 100 parts, by weight, of the soy milk generally will provide the desired protein coagulation rate. After boiling the soy milk for a sufficient time period to reduce the intensity of the bean flavor and to destroy antinutritional factors, the acidogen system components are added with mild stirring to the milk while it is still hot, i.e., at a temperature of at least 85° C. As mentioned previously, it is presently preferred to incorporate the acidogen components in increments over a time period ranging from about 20 to 30 minutes.

After acidogen addition has been completed and the curd has formed, it is allowed to settle for at least 30 minutes prior to being separated from the whey. Finally, the separated curd is pressed to the desired moisture content which typically is 80 percent, or slightly greater. As shown hereinafter by specific example, tofu prepared in accordance with this invention possesses much improved gel strength compared to that prepared by a conventional, normally used coagulant such as calcium sulfate.

The acidogen system of this invention is satisfactorily employed as a substitute for yeast in leavening bakery products. In this embodiment, the system is added to prepared flour mixes in combination with a $CO_2$-releasing compound, particularly sodium bicarbonate. The leavening ability of the acidogen system is comparable to or improved over yeast. The products prepared possess excellent texture equivalent to yeast leavened products.

The methods of adding the acidogen components are as conventionally carried by those skilled in the raised bakery products art. Thus, it is not deemed necessary to discuss any addition techniques employed herein in detail. In present practice, the particular acidogen system preferred is hydrogen peroxide and pyruvaldehyde in combination with sodium bicarbonate, due to the texture, taste and overall appearance of the bakery products obtained. The percentage of each ingredient of the leavening system, based on the weight of flour, may range generally from 0.1 to 3.0 percent of the vicinal dione component; from 0.3 to 3.0 percent for the hydrogen peroxide component; and from 1.0 to 3.5 percent for the sodium bicarbonate. Within these ranges, based on the weight of the flour, 0.5 to 1.5 percent of vicinal dione, 1.0 to 2.0 percent of hydrogen peroxide and about 2 percent of sodium bicarbonate are preferably employed at present to make pizza dough. For biscuit application, from about 0.2 to 1.0 percent dione, form 0.5 to 0.7 percent hydrogen peroxide and 1.5 to 2.0 percent sodium bicarbonate, base on the flour weight, are preferred at present.

The acidogen system of this invention may also be incorporated in powdered baking mixtures so as to provide leavening thereto when the powder is moistened and heated. It, likewise, is satisfactorily incorporated as the leavening agent in doughs which are to be frozen and then subsequently baked as desired. In these and other applications, the leavening system herein is more economical than the fat encapsulated glucono-delta-lactone now used.

The acidogen system of this invention is applicable for the preparation of bakery products such as bread, rolls, biscuits, pizza dough and various refrigerator doughs. Being miscible, but nonreactive with milk and other aqueous media, and also being food acceptable at the levels used, the acidogen system provides an economical method for preparing various cheeses either in a batchwise or continuous manner. It, likewise, provides a simple, economical method for preparing textured soybean curd, i.e., tofu, of commercially acceptable quality. It also supplies part of the leavening system for preparing a variety of raised bakery products. Finally, the dione components of the acidogen system which are presently preferred, that is, glyoxal and pyruvaldehyde, are, in combination with hydrogen peroxide, readily available commercially at moderate cost.

For a fuller understanding of the nature of this invention, reference may be made to the following examples, which are given to illustrate the invention and are not to be construed in a limiting sense.

EXAMPLE 1

Forty gallons (157 kg.) of fresh skim milk is charged to a 50-gallon (190 l.), jacketed cheese vat and heated to 33° C. (90.6° F.) by circulating warm water through the jacket. The pH of the milk is 6.6 and it contains, by weight, 8.8 percent total solids and less than 0.05 percent butterfat. 760 g. of 40 percent aqueous glyoxal (0.19 parts, by weight, glyoxal per 100 parts, by weight, of the milk) and 1067 g. of 30 percent hydrogen peroxide (0.20 parts, by weight, $H_2O_2$ per 100 parts, by weight, of the milk) are added to the milk. After mixing in the acidogen system, the milk is allowed to set in a quiescent state for 2 hours and a firm curd is formed. The pH is 4.85. The curd is cut in a conventional manner and then cooked to a maximum temperature of 55° C. for 2 hours. The whey is then drained, and the curds are successively washed and drained 3 times in the usual manner. The pH of the whey is 4.38. The yield of curds is 45 lbs. (20.4 kg.). They are firm and stable, exhibiting color, odor, taste and texture equivalent to curds produced by conventional culture methods.

EXAMPLE 2

This example illustrates the process of the invention employing a food-grade, free acid in addition to the glyoxal-hydrogen peroxide acidogen system of Example 1.

For this experiment, 45 gallons (176 kg.) of fresh, skim milk at a temperature of 10° C. is charged to a stirred reactor. Phosphoric acid is added to the milk with stirring until the pH of the milk measures 5.45, about 336 g. of 85 percent acid being used (0.16 part, by weight, $H_3PO_4$ per 100 parts, by weight, of milk).

Forty gallons (157 kg.) of the above partially acidified milk is pumped into the 50-gallon cheese vat described in Example 1 and heated to 33° C. Then, 380 g. of 40 percent glyoxal (0.10 part, by weight, glyoxal per 100 parts, by weight, of milk) and 1013 g. of 30 percent hydrogen peroxide (0.19 part, by weight, $H_2O_2$ per 100 parts, by weight, of milk) are added with stirring. The resulting milk mixture is then maintained undisturbed at 33° C. for 150 minutes, during which time satisfactory cuttable curd is formed. This is cut in the usual manner. The pH of the whey is 4.87. Processing of the curd as set forth in Example 1 yields a firm and stable curd, with color, odor and other characteristics like the cheese curd product of Example 1. After standing for 24 hours at room temperature, this curd product has a pH of 4.48.

EXAMPLES 3-7

The pH of 500 ml. of refrigerated skim milk is lowered from 6.66 to 5.16 by adding 85 percent phosphoric acid. The partially acidified milk is divided into 100-ml. portions. To each portion is added a dione compound as listed in the table below in the amount indicated, followed by 0.6 g of 30 percent hydrogen peroxide (0.18 part, by weight, $H_2O_2$ per 100 parts, by weight, of milk). Each milk-acidogen mixture is then heated to 32° C. and maintained at this temperature in a quiescent state until a firm curd forms. The curd is then cut, cooked, washed and drained as previously described. The finished cottage cheese curds have color, odor, taste and texture equivalent to the products of the previous examples.

Results listed in the following table include the dione components employed, the concentration of dione (parts, by weight, per 100 parts, by weight, of milk), the reaction time to cuttable curd formation, the initial pH of the formed curd, and the pH of the cooked curd.

TABLE 1

| Example | Dione | Concentration Dione-pbw | Reaction Time Minutes | pH - Cut Curd | pH - Cooked Curd |
|---|---|---|---|---|---|
| 3 | Glyoxal | 0.08 | 120 | 4.84 | 4.42 |
| 4 | Pyruvaldehyde | 0.10 | 45 | 4.77 | 4.44 |
| 5 | Diacetyl | 0.12 | 42 | 4.76 | 4.54 |
| 6 | 2,3-Pentanedione | 0.15 | 30 | 4.85 | 4.64 |
| 7 | 1,2-Cyclohexanedione | 0.20 | 120 | 4.85 | 4.56 |

EXAMPLE 8

Extraction of Soybean Milk

One and one-half cups of whole yellow soybeans, No. 480, distributed by Natural Sales Company, Pittsburgh, Pennsylvania, were soaked in 6 cups of water for 10 hours, rinsed and drained. They were then divided into 2 equal portions. Each portion was successively combined with 2 cups of water in a blender and pureed at high speed until smooth. The puree was added to boiling water in a cooking pot. Heating of the cooking pot was continued with frequent stirring of the contents to prevent sticking. When sudden foaming was observed in the pot, the contents were poured into a pressing sack fitted into a colander which was positioned over another container lined with cheese cloth.

After rinsing the cooking pot and transferring any remaining puree into the pressing sack, the sack was twisted closed and pressed against the colander to express the soy milk. The sack was then opened, closed and twisted as before to express additional milk. The cellulose-type solid residue remaining in the pressing sack was transferred to a container, mixed with 3 cups of water and returned to the pressing sack. The sack was closed and pressed as before.

Preparation of Tofu

The soy milk collected was poured into the cooking pot, brought to a boil and cooked over medium heat for 5-7 minutes. Solutions of the acidogen components were prepared by diluting 4.5 g of 40 percent glyoxal with 118.5 g. water, and then preparing a solution containing 3.0 g. of 30 percent hydrogen peroxide ($H_2O_2$) in 118.5 g. water. Each solution was then divided into 3 parts.

After removing the soy milk from the burner, one portion of each acidogen component was added thereto with stirring. The soy milk was then allowed to stand for 7 minutes. Another portion of each solution of acidogen component was then sprinkled onto the soy milk surface. After an additional 3-5 minutes, the remaining acidogen solutions were sprinkled onto the soy milk surface. The soy milk was then left undisturbed for 15–20 minutes (total treating/storage time was approximately 30 minutes) during which time curd formed in the milky liquid.

A fine-mesh strainer was then gently pressed into the pot and several cups of whey collected in it. The whey was ladled into a settling container adjacent to the cooking pot to moisten the cloth lining. The curds and any remaining whey were then transferred into the settling container, after which the cloth was folded over the curds. A lid was placed on top of the cloth and a 250 g.–750 g. weight placed on the lid. The weight was maintained on the lid until no more whey dripped from the settling container.

The cloth wrapped curds were placed in cold water, unwrapped and cut into halves. After being kept under water for an additional 3–5 minutes, the tofu was lifted out and drained.

Following this procedure, a series of experiments were conducted employing acidogen systems of this invention as shown in the table below. For comparison, tofu was prepared employing two presently used coagulants. In the table are listed the percentage of acidogen added, based on the weight of the soybean milk, the cutting pH and the gel strength of the tofu.

TABLE 2

| Acidogen | % Acidogen Added | Cutting pH | Gel Strength (g.) |
|---|---|---|---|
| Glyoxal/$H_2O_2$ | 0.45/0.3 | 4.34 | 34.5 |
| Glyoxal/$H_2O_2$ | 0.40/0.3 | 4.52 | 26.5 |
| Glyoxal/$H_2O_2$ | 0.35/0.3 | 4.64 | 25.5 |
| Calcium chloride | 0.25 | 5.53 | 3.5 |
| Calcium sulfate | 0.25 | 5.59 | 10.0 |
| Calcium sulfate | 0.40 | 5.53 | 2.0[1] |

[1] Curds were mushy, fell apart when lifted from cold water.

The above results indicate that tofu prepared by prior art coagulants is significantly more fragile than that prepared by the hydrogen peroxide-glyoxal acidogen system, incorporating various levels of glyoxal.

EXAMPLE 9

Preparation of Biscuit Dough

Using a Kitchen Aid table top mixer, 115 g. flour and 3.5 g. salt were sifted into the mixer bowl for each biscuit batch prepared. Shortening (33 g.) was cut into 4–5 pieces and blended into the flour-salt mixture using the No. 1 mixer speed. To 82 g. portions of skim milk, the leavening agent components were added in the amounts shown in the table below. One leavening agent-milk aliquot was added to the flour-shortening mix and blended until the dough started to cling to the beater. The dough was placed onto a lightly floured board and kneaded lightly. It was then rolled to the desired thickness and cut with a 2-inch biscuit cutter. The biscuits were baked at 450° F. for 12 minutes. After baking, they were evaluated for degree of leavening (height of biscuit shape measured before and after baking), texture and evenness of browning. Using this procedure, results obtained are set forth in the following table. In the table are given the percentage of acidogen used based on the weight of flour, the percent increase in height of the biscuit with baking and observations on overall color and texture of the baked product. Also listed are the results obtained from biscuits prepared with baking powder as leavening agent.

TABLE 3

| Acidogen/% | Average % Height Increase | Baked Biscuit Properties Texture | Color |
|---|---|---|---|
| 1. $NaHCO_3$ — 1.8<br>$H_2O_2$ — 0.6<br>pyruvaldehyde — 0.23 | 209 | fine crumb | light golden |
| 2. $NaHCO_3$ — 1.8<br>$H_2O_2$ — 0.6<br>pyruvaldehyde — 0.46 | 247 | small cells, slightly flaky | golden |
| 3. $NaHCO_3$ — 1.8<br>$H_2O_2$ — 0.6<br>pyruvaldehyde — 0.68 | 256 | open, flaky | golden |
| 4. baking powder — 7.0 | 275 | open, flaky | creamy |

As indicated, essentially equivalent results as to texture and degree of rising are obtained using the acidogen system of this invention in an amount less than half that of the conventional baking powder.

EXAMPLE 10

A pizza dough was prepared as a control, employing the following ingredients per each 100 g. all-purpose flour:

| | g. |
|---|---|
| milk solids, nonfat | 6.0 |
| salt | 1.0 |
| sucrose | 2.0 |
| dextrose | 4.0 |
| glucono-delta-lactone | 4.24 |
| $NaHCO_3$ | 2.0 |
| water | 67.0 |

The flour and all of the dry ingredients were blended together by sifting 2 times. The water heated to approximately 90° F. was added and mixed into the sifted ingredients using low speed setting of the mixer. The dough was placed onto a greased baking pan and allowed to stand for approximately 5 minutes before being rolled out to a thin sheet. The dough was then baked at 425° F. until done (approximately 20 minutes).

The baked product was very bread-like in appearance, was moist and exhibited fine crumb characteristics. It had developed a light tan crust.

EXAMPLE 11

Pizza dough was prepared as in Example 10, following the same general procedure and recipe. In this example, however, the glucono-delta-lactone was substituted by 2.0 g. of 30 percent $H_2O_2$ and 2.0 g. of 40 percent pyruvaldehyde, per each 100 g. of flour.

The baked product was of fine crumb structure with a light tan, smooth crust. It had a bread-like appearance and smell. As the baked thickness was approximately 3 times that of the original unbaked dough, the leavening action of the acidogen was excellent.

EXAMPLE 12

In this example, pizza dough was prepared as outlined in Example 10, except that the dextrose was omitted. Also, 1.75 g. of 30 percent $H_2O_2$ and 1.25 g. of 40 percent pyruvaldehyde were used in place of the glucono-delta-lactone. The baked product rose to 3 times the original dough thickness. It had a bread-like texture with a light tan crust.

I claim:

1. As a chemical acidogen system for supplying acid to proteincontaining foodstuffs and leavening to bakery doughs, hydrogen peroxide in combination with at least one aliphatic $C_{2-6}$ dione wherein the carbonyl groups are vicinal to each other, said dione conforming to one of the structures:

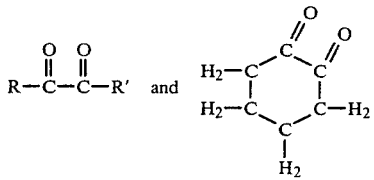

wherein R and R' are each hydrogen or $C_{1-2}$ alkyl.

2. The chemical acidogen system of claim 1 wherein the dione is glyoxal.

3. The chemical acidogen system of claim 1 wherein the dione is pyruvaldehyde.

4. The chemical acidogen system of claim 1 wherein the dione is diacetyl.

* * * * *